April 30, 1968  A. G. BODINE, JR  3,380,195
RESONANT APPARATUS FOR CLEANING WITH LOOSE GRANULES
Filed Jan. 5, 1965  5 Sheets-Sheet 1
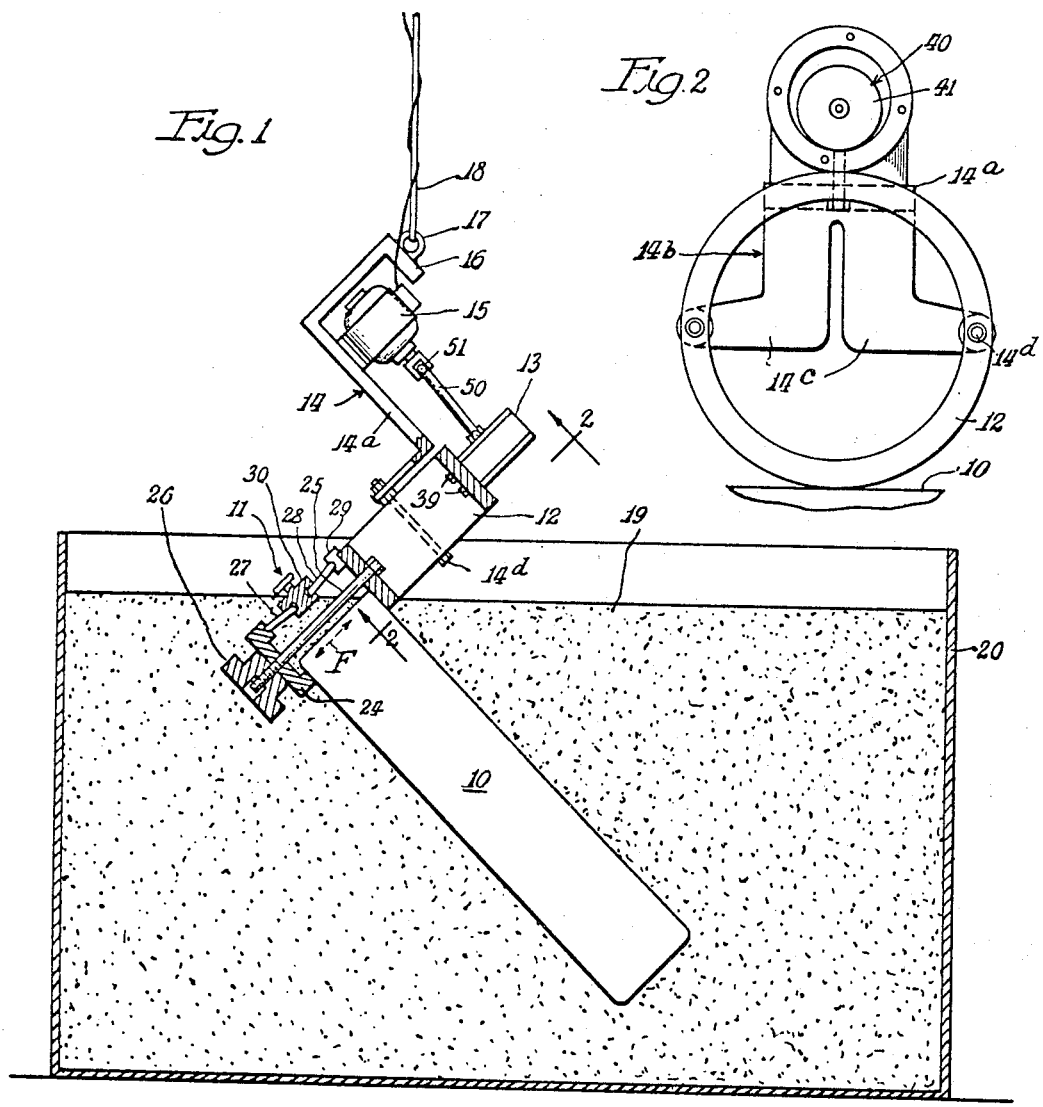
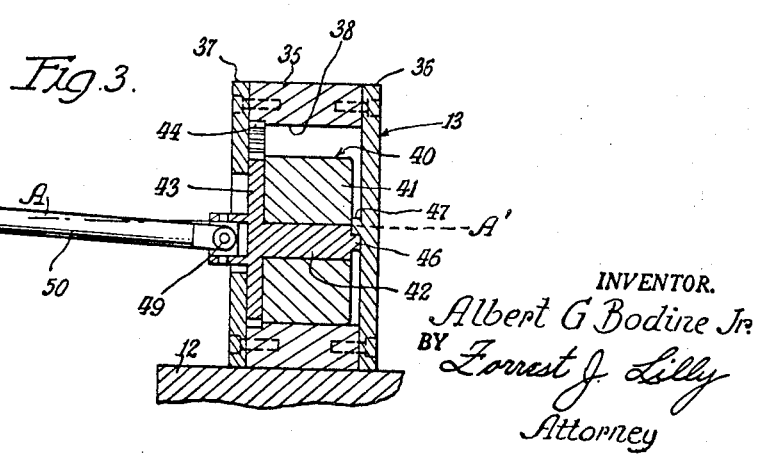
INVENTOR.
Albert G Bodine Jr.
BY Forrest J. Lilly
Attorney

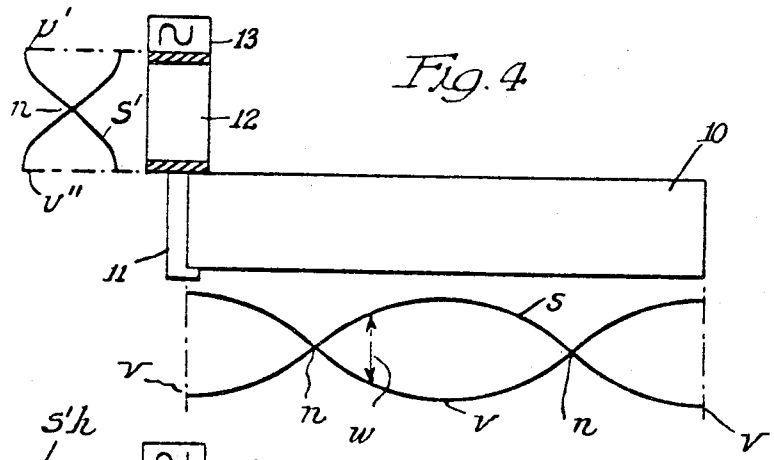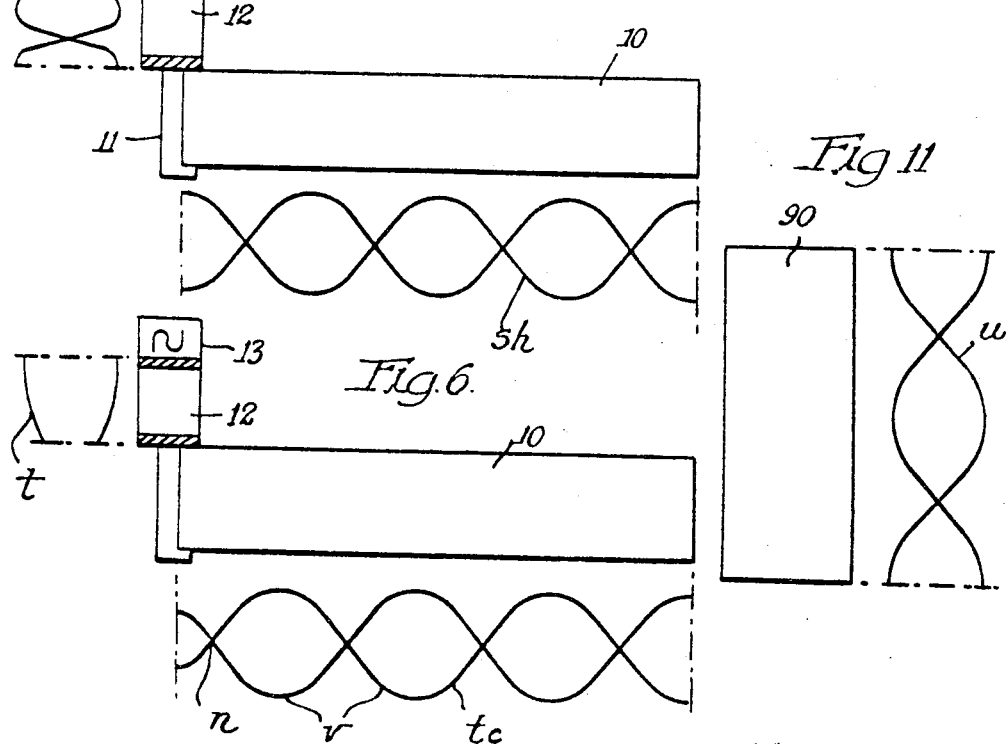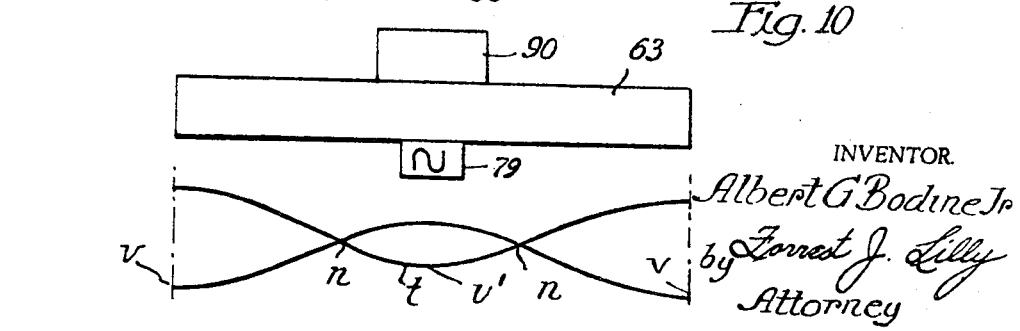

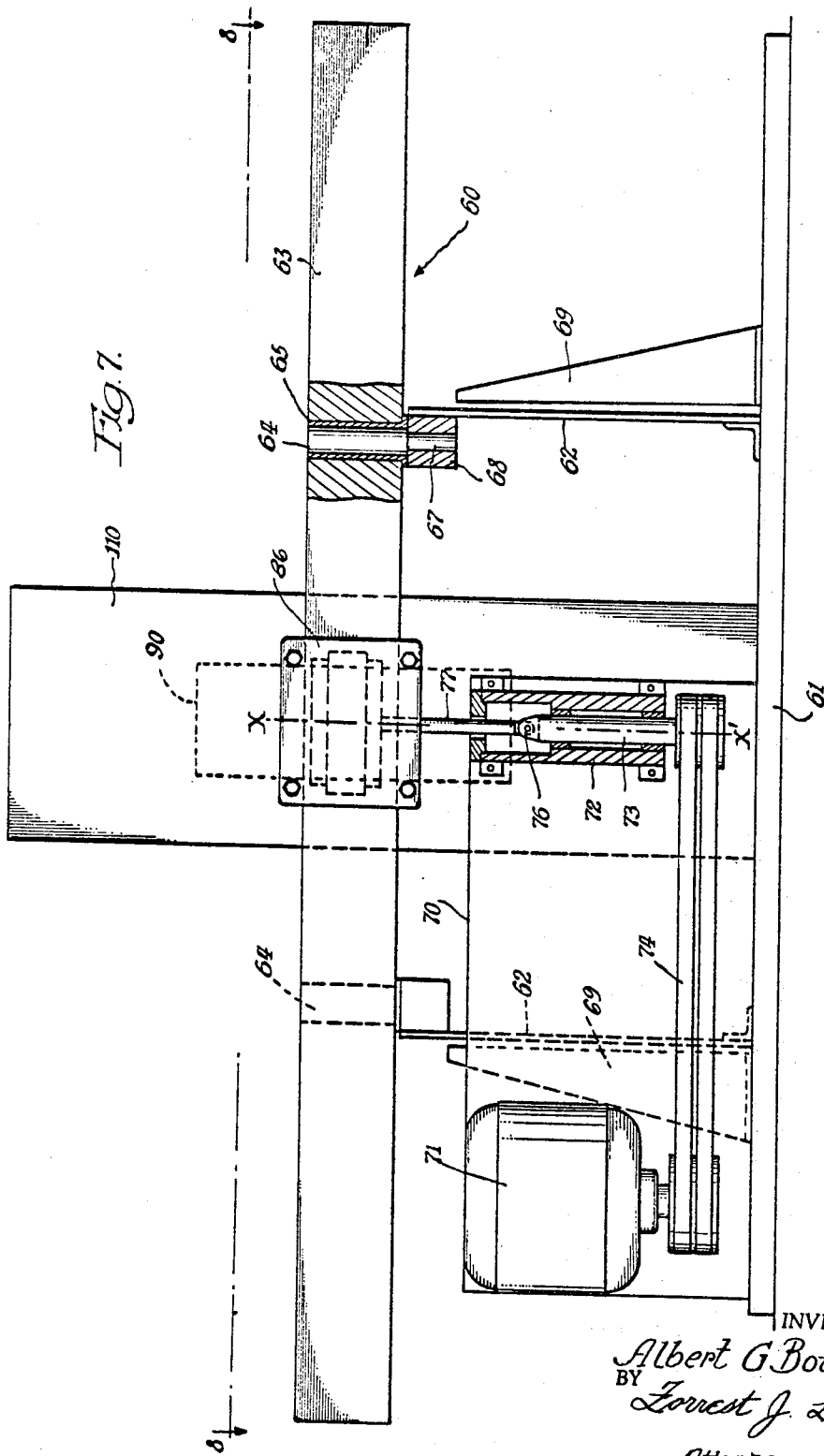

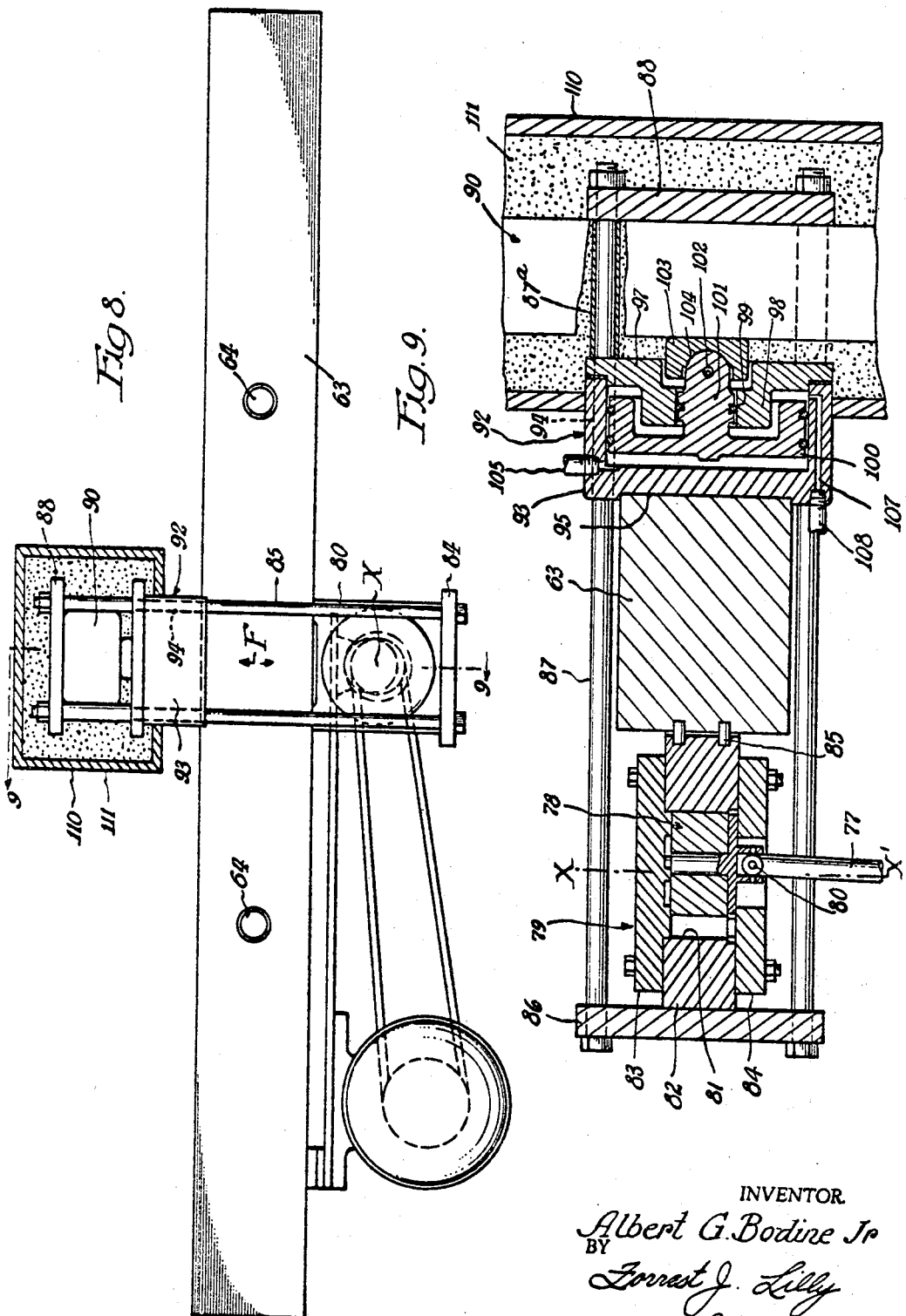

April 30, 1968  A. G. BODINE, JR  3,380,195
RESONANT APPARATUS FOR CLEANING WITH LOOSE GRANULES
Filed Jan. 5, 1965  5 Sheets-Sheet 5
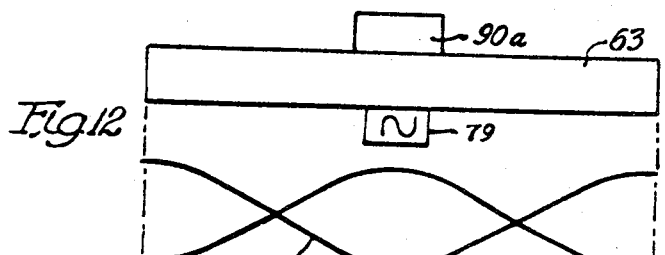
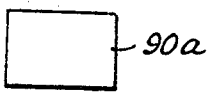
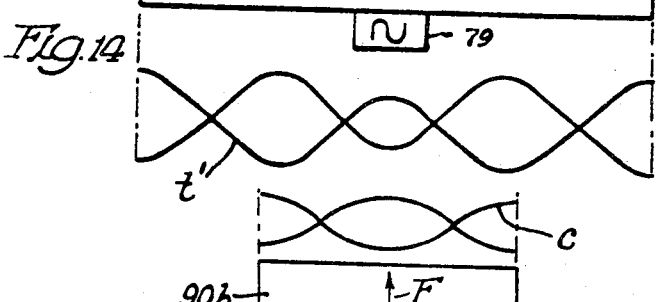
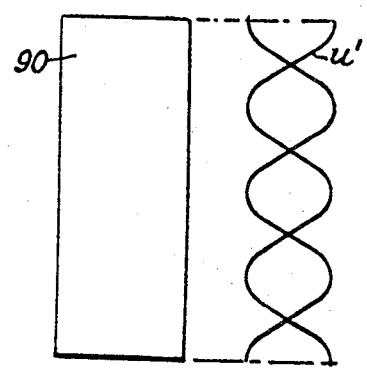
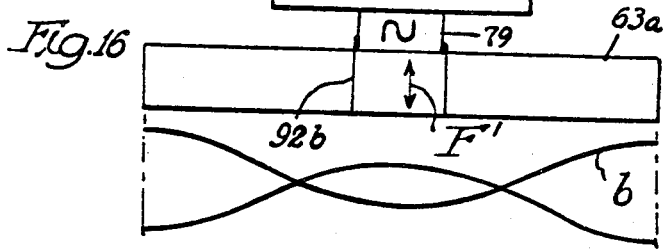
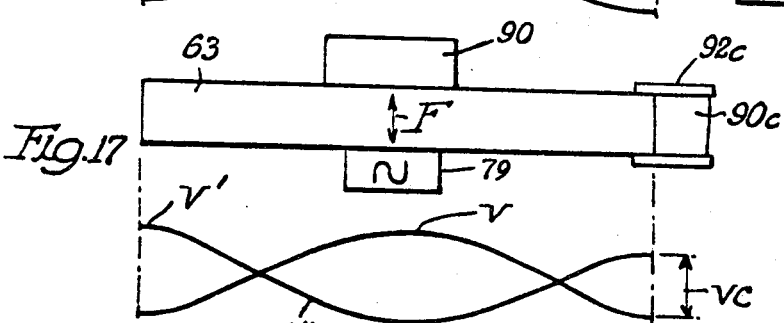
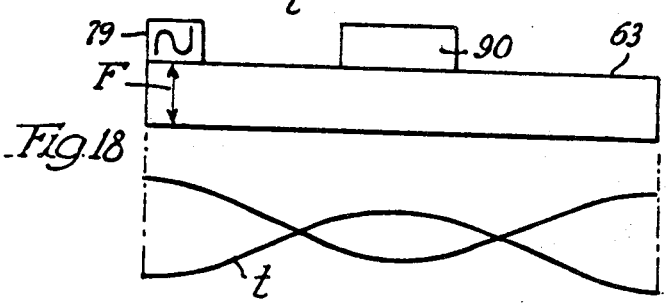
INVENTOR.
Albert G. Bodine Jr.
BY Forrest J. Lilly
Attorney

United States Patent Office 3,380,195
Patented Apr. 30, 1968

3,380,195
RESONANT APPARATUS FOR CLEANING
WITH LOOSE GRANULES
Albert G. Bodine, Jr., Los Angeles, Calif.
(7877 Woodley Ave., Van Nuys, Calif. 91406)
Continuation-in-part of application Ser. No. 274,975,
Apr. 23, 1963. This application Jan. 5, 1965, Ser.
No. 423,559
10 Claims. (Cl. 51—7)

ABSTRACT OF THE DISCLOSURE

Apparatus for treating metal parts by immersing the parts in loose granules of cleaning material and coupling the parts and the material to an elastic member that is vibrated resonantly.

---

This invention relates generally to apparatus for cleaning metal parts and the like of foreign material such as hard crusts or scale, or adhesive coatings of any kind, including remaining fragments or surface coatings of adhering hard material, or in certain foundry techniques the removal of whole cores, and also for cleaning the interior cavities of castings of the metal filaments or "whiskers" often caused by reason of intrusions of the metal into the sand core.

This application is a continuation-in-part of application Ser. No. 274,975, filed Apr. 23, 1963, now abandoned.

The problems incident to the cleaning of castings or stampings of foreign encrustations, sand core material, intrusion filaments, machining burrs, or excess metal flow, have not been solved in the past in a completely satisfactory manner, and some of these castings problems have, in fact, become aggravated with the modern trend toward harder and tougher core adhesives. The general object of the present invention is to provide novel apparatus for solving these problems of metal parts surface conditions.

This invention is especially applicable to the removing of rust, and to general surface preparation prior to painting or plating.

One problem area of the prior art is that of breaking up and removing certain sand cores from castings. To facilitate core removal, the sand core is generally made up with weaker adhesive substance than would otherwise be desirable. To obtain more accurate castings, permit thinner walls, and improve tolerance control, it would be very desirable if a stronger plastic glue could be used. The problem heretofore has been the lack of a suitable method for removing such a core from the casting. Even when it has been possible to break the core from the casting, these plastic adhesives in the core sometimes leave coatings on the casting of such hardness that they are very difficult to remove.

Another problem has been to remove from the insides of the castings the common metal filaments or "whiskers" resulting from intrusion of the metal into the sand core.

Objects of the invention are therefore to provide novel and improved apparatus for cleaning stampings, castings and the like of foreign material such as hard crusts, scale, or adhesive coatings, including remaining fragments or surface coatings of adhesive core material, for breaking and removing whole cores from castings, and for cleaning the interior surfaces of parts of coatings, metal filaments or whiskers.

An additional object is to clean off rust, oxidized oil, polishing rouge smut, etc., from various castings, stampings or machined parts, without the use of liquids or of air blast.

The present invention, in its most usual form, proceeds by resonantly vibrating the part while covered with a body of hard, loose, granular or particulate material, in some cases irregularly shaped grit, and in others, metal pellets, with or without scrubbing qualities, and in some instances preferably of high density, such as steel balls, or lead shot.

A sonic wave or vibration generator is employed, and acoustically coupled thereto is an elastic vibration transmission means. This combination of vibration generator and elastic vibration transmission means has an acoustic coupling or output means embodying a clamp, which is rigidly engageable with the part. The sonic generator is driven at a frequency which will set up in either, or both, of the acoustically intercoupled elastic vibration transmission means and part, a sonic standing wave pattern. Standing waves can include resonance phenomena, and relatively large amplitude elastic vibrations of the part are therefore attainable under such conditions. The elastic vibration transmission means can be designed for various effects within the scope of the invention. For example, by making it relatively small, in comparison with the dimensions of the part, and making it elastically quite stiff, the resonant frequency of the system tends to be high, and there is established a resonant, elastic standing wave pattern, a large or major fraction of which appears within the part itself, with the remainder in the elastic vibration transmission means. These conditions are particularly good for certain applications of the invention, as will later be described. By enlarging the dimensions of the vibration transmission means, and reducing its elastic stiffness, the resonant frequency of the system is lowered, a larger portion of the standing wave pattern is within the vibration transmission means, a lesser portion occurs within the part, and a larger vibration stroke amplitude is obtained for the part. This mode of practicing the invention also has certain advantages, as will later appear. Both are within the scope of the invention. Another practice within the scope of the invention is to run the generator at an overtone frequency The higher frequencies mean higher accelerations of the vibrating part, with substantial fractions of wavelength therein, and are beneficial for certain cases.

By the expression "sonic vibration" I mean elastic vibrations, i.e., cyclic elastic deformations, which travel through a medium with a characteristic velocity of propagation. If these vibrations travel longitudinally, or create a longitudinal wave pattern in a medium or structure having uniformly distributed constants of elasticity or modulus, and mass or density, this is sound wave transmission. Regardless of the vibratory frequency of such sound wave transmission, the same mathematical formulae apply, and the science is called sonics. In addition, there can be elastically vibratory systems where the essential features of concentrated density or mass appear as a localized influence or parameter, known as a "lumped constant;" and another such lumped constant can be localized or concentrated elastically deformable element, affording a local effect known as elasticity, modulus, or "stiffness." Fortunately, these constants, when functioning in an elastically vibratory system such as mine, have cooperating and mutually influencing effects like equivalent factors in alternating current. In fact, in both distributed and lumped constant systems, density or mass is mathematically equivalent to inductance (a coil); elasticity, modulus, or "stiffness" is mathematically equivalent to capacitance (a condenser); and friction or other pure energy dissipation is mathematically equivalent to resistance (a resistor).

Because of these equivalents, my elastic vibratory systems with their mass and stiffness and energy consumption, and their sonic energy transmission properties, can be viewed as equivalent circuits, where the functions can be expressed, considered, changed and quantitatively analyzed by using well proven electrical formulae.

It is important to recognize that the transmission of sonic energy into the interface or work area between two parts to be moved against one another requires the above mentioned elastic vibration phenomena in order to accomplish the benefits of my invention. There have been other proposals involving simple bodily vibration of some part. However, these latter do not result in the benefits of my sonic or elastically vibratory action.

Since sonic or elastic vibration results in the mass and elastic elements of the system taking on these special properties akin to the parameters of inductance and capacitance in alternating current phenomena, wholly new performances can be made to take place in the mechanical arts. The concept of acoustic impedance becomes of paramount importance in understanding performances. Here impedance is the ratio of cyclic force or pressure acting on the media to resulting cyclic motion, just like the ratio of voltage to current. In this sonic adaptation impedance is also equal to media density times the speed of propagation of the elastic vibration.

In this invention impedance is important to the accomplishment of desired ends, such as where there is an interface. A sonic vibration transmitted across an interface between two media or two structures can experience some reflection, depending upon differences of impedance. This can cause large relative motion, if desired, at the interface.

Impedance is also important to consider if optimized energization of a system is desired. If the impedances are adjusted to be matched somewhat, energy transmission is made very effective.

Sonic energy at fairly high frequency can have energy effects on molecular or crystalline systems. Also, these fairly high frequencies can result in very high periodic acceleration values, typically of the order of hundreds or thousands of times the acceleration of gravity. This is because mathematically acceleration varies with the square of frequency. Accordingly, by taking advantage of this square function, I can accomplish very high forces with my sonic systems. My sonic systems preferably accomplish such high forces, and high total energy, by using a type of sonic vibration generator taught in my Patent No. 2,960,314, which is a simple mechanical device. The use of this type of sonic vibration generator in the sonic system of the present invention affords an especially simple, reliable, and commercially feasible system.

An additional important feature of these sonic circuits is the fact that they can be made very active, so as to handle substantial power, by providing a high "Q" factor. Here this factor Q is the ratio of energy stored to energy dissipated per cycle. In other words, with a high Q factor, the sonic system can store a high average level of sonic energy, to which a constant input and output of energy is respectively added and subtracted. Circuit-wise, this Q factor is numerically the ratio of inductive reactance to resistance. Moreover, a high Q system is dynamically active, giving considerable cyclic motion where such motion is needed.

A valuable function of these sonic circuits is to provide enough extra capacitative reactance so that the inertia of various necessary bodies or masses in the system does not operate to the detriment of the process. For example, a mechanical oscillator or vibration generator of the type normally used in my inventions always has a body, or carrying structure, for containing the cyclic force generating means. This supporting structure, even when minimal, still has mass, or inertia. This inertia could be a force-wasting detriment, acting as a blocking impedance using up part of the periodic force output just to accelerate and decelerate this supporting structure. However, by use of elastically vibratory structure in the system, the effect of this mass, or the mass reactance resulting therefrom, is counteracted at the frequency for resonance; and when a resonant acoustic circuit is thus used, with adequate capacitance (elastic reactance), these blocking impedances are tuned out of existence, at resonance, and the periodic force generating means can thus deliver its full impulse to the "work," which is the resistive component of the impedance.

One desirable specie of my invention employs, as the source of sonic power, a sonic resonant system comprising a solid elastic member in combination with an orbiting mass oscillator. This combination has many unique and desirable features. For example, this orbiting mass oscillator has the ability to adjust its input power and phase to the resonant system so as to accommodate changes in the work load, including changes in either or both the reactive impedance and the resistive impedance. This is a very desirable feature in that the oscillator "hangs on" to the load even as the load changes.

It is important to note that this unique advantage of the orbiting mass oscillator accrues from the combination thereof with the acoustic resonant circuit, so as to comprise a complete acoustic system. In other words, the orbiting mass oscillator is matched up to the resonant part of its system, and the combined system is matched up to the acoustic load, or the job to be accomplished. One manifestation of this proper matching is a characteristic whereby the orbiting mass oscillator tends to "lock in" to the resonant frequency of the resonant part of the system.

The combined system has a unique performance which is exhibited in the form of a greater effectiveness and particularly greater persistence in a sustained sonic action as the work process proceeds or goes through phases and changes of conditions. The orbiting mass oscillator, in this matched-up arrangement, is able to hang on to the load and continue to develop power as the sonic energy absorbing environment changes with the variations in sonic energy absorption by the load. The orbiting mass oscillator automatically changes its phase angle, and therefore its power factor, with these changes in the resistive impedance of the load.

A further important characteristic which tends to make the orbiting mass oscillator hang on to the load and continue the development of effective power, is that it also accommodates for changes in the reactive impedance of the acoustic environment while the work process continues. For example, if the load tends to add either inductance or capacitance to the sonic system, then the orbiting mass oscillator will accommodate accordingly. Very often this is accommodated by an automatic shift in frequency of operation of the orbiting mass oscillator by virtue of an automatic feedback of torque to the energy source which drives the orbiting mass oscillator. In other words, if the reactive impedance of the load changes this automatically causes a shift in the resonant response of the resonant circuit portion of the complete sonic system. This in turn causes a shift in the frequency of the orbiting mass oscillator for a given torque load provided by the power source which drives the orbiting mass oscillator.

All of the above mentioned characteristics of the orbiting mass oscillator are provided to a unique degree by this oscillator in combination with the resonant circuit. As explained elsewhere in this discussion the kinds of acoustic environment presented to the sonic source by this invention are uniquely accommodated by the combination of the orbiting mass oscillator and the resonant system. As will be noted, this invention involves the application of sonic power which brings forth some special problems unique to this invention, which problems are primarily a matter of delivering effective sonic energy to the particular work process involved in this invention. The work process, as explained elsewhere herein, presents a special combination of resistive and reactive impedances. These circuit values must be properly met in order that the invention be practiced effectively.

One desirable practice of the invention is to provide the vibration transmission means in the form of an elastic member of distributed constant type in which a resonant standing wave can be set up. This member may be intercoupled between the generator and clamp, but not necessarily so, for the generator can alternately be intercoupled between this member and the clamp. In the latter case, the vibration transmitting means transmits vibrations merely within itself, rather than to the part. In this case, its function is not to transmit vibration to the part, but, primarily, to add an amount of stiffness reactance to the vibratory system for the purpose of balancing out force-wasting mass reactance. In either case, when the part is clamped, and the generator driven at a frequency to resonate the system, the stiffness reactance of the vibration transmission means "tunes out" or cancels the mass reactance owing to the masses of the generator, of the part, and of the vibration transmission means itself, so that the vibration generator can easily vibrate the part under sonic conditions of high cyclic acceleration, notwithstanding these otherwise force-consuming masses. Considering its function in this aspect, the vibration transmission means may aptly be termed an elastic stiffness reactor. The vibration transmission means also contributes high "Q" to the vibratory sonic system, as well as facilitating the vibration of the masses involved. The Q factor of vibratory systems will be understood to be a sonic figure of merit analogous to flywheel effect in rotational systems, or sharpness of tuning in electronic systems.

Also, in some forms of the invention the virbration transmission means, or elastic stiffness reactor, in which the standing wave is established is deliberately intercoupled between the vibration generator and the part, so as to function as an acoustic lever. That is to say, as will be made still more clear hereinafter, in this case the vibration transmission means is arranged to have high vibration amplitude and low force at its coupling point with the vibration generator, and reduced vibration amplitude, but correlative force gain, at its coupling point with the part. From the acoustic impedance viewpoint, the vibration transmission means thus fuctions to match a relatively low impedance generator to a relatively high impedance "load," i.e., part and surrounding particulate matter.

The sonic vibration generator and transmission means combination, for good operation, should have, at the clamp, an output impedance of the order of magnitude of the vibratory impedance presented by the part at the point of clamping. The expression impedance, as used herein, denotes the ratio of vibratory force amplitude to vibratory velocity amplitude. It will be seen that the desired conditions are met if the ratio of force to velocity at the output end of the generator and vibration transmission means combination, i.e., at the clamp, is comparable with the required ratio of force to velocity in the part, at the clamping point, when the part is undergoing vibration. Under such conditions, good power can be transferred from the vibration generator into the part for large amplitude sonic vibration thereof against the acoustic resistance imposed by the body of particles in which the part is buried.

To carry out the process, an apparatus in one of the forms discussed briefly above is clamped to the part, the part lowered into a body of the particulate matter, and the vibration generator operated, causing vibration of the part. The body of loose particles, e.g., sand, metal balls, etc., covering the vibrating part acts acoustically as a fairly dead or inert mass, permitting the part to vibrate by movement therein relative to the particles. The part moves "out of phase" relative to the particles in contact therewith. The particles under these sonic conditions have considerable fluidity, or mobility, and thus, moving relative to each other, tend to remain closed in on the part, assuring good surface contact and good relative or out-of-phase movement between the particles and part, with resulting highly effective cleaning activity.

The body of loose particles presents to the vibrating part an acoustic impedance which is largely resistive or frictional in nature, the reactive component being small relative to the resistive component. The sonic wave radiation into the particles is thus governed by a frictional or resistive type of impedance, and while the particles are set into vibration by the sonic wave radiated into and transmitted through them, the fairly resistive impedance acts to attenuate the wave to substantially zero amplitude after a very short transmission path through the particles. The mass of loose particles thus has no substantial tendency to vibrate with the part, or sustain sound wave transmission, as it would do if the particles were imagined to be integrated into a solid elastic structure capable of transmitting elastic vibration. Instead, the particles act as an inert, mobile, conforming mass, with large friction between particles and part, and between one another, so as to absorb large energy, and act as a high-friction-type resistance. They thus tend to remain packed or closed in on the part, so that the part vibrates with good amplitude relative to the particles. Relative movement between the vibratory part and the particles is thus maximized, giving large relative cyclic motion of the part surfaces across the particles. Stated in other language, the mass of loose particles does not constitute a discrete acoustic circuit, capable of sustaining sound wave transmission, and is without any property of resonance. The resonance frequency of a free individual particle would of course be of a considerably higher order than the operating frequency of the system, and does not come into play.

The surface coating or crust, when substantial, may also be loosened or removed by another sonic activity. In general, the speed of sound will be different in the material of the coating than in the part, with resulting tendency for differential, relative or out-of-phase vibratory movements of part and coating. Thereby, shear forces become effective at the interface between part and coating, to loosen and break the coating from the part. The "loading" of the coating by the particulate matter in contact therewith also materially reduces the speed of sound in the coating, and very materially augments this activity by corresponding increase in the relative or out-of-phase movement between part and coating. It is sometimes desirable to use particles of large inertia, such as steel balls or lead shot. These large inertia particles are particularly effective in breaking the fine metal filaments or whiskers off the interior surfaces of a vibrating part. The higher frequencies, obtained as indicated above, are particularly favorable for removal of hard coatings of core adhesive, which is often a brittle material, and responds best to the high accelerations, and therefore high cyclic forces, which are characteristic of the higher frequencies.

In still other cases dealing particularly with cast parts, it is the purpose to break out the sand core, and then clean the part. In anticipation of the availability of the present invention, the core may have been composed using an unusually hard plastic glue. Subjected to the present process, the part may be vibrated elastically in a standing wave pattern. The sand core, adhesively joined to the part, is thereby subjected to alternating sonic frequency half cycles of compression and tension, and soon fractures by fatigue failure. In addition, the sand core material, adhesively joined to the part, is not subject to participation in the relatively large amplitude standing wave pattern undergone by the metal part, and as a consequence, shear forces are set up at the interface between the part and the core, and these break the core free of the part. Here again we have the above mentioned sonic effect of differing speed of sound, causing large relative movement between core and part. In this particular aspect of the invention, the use of the particulate matter about the part may be eliminated. However, another effect conducive to breaking up of the core is the hammering of the core against the particulate matter. This effect is enhanced by use of high-density pellets. The particulate matter is thus useful in all cases.

Certain preferred illustrative embodiments of the invention will now be described, reference for this purpose being had to the accompanying drawings, wherein:

FIG. 1 is a vertical medial section, partly in elevation, through an apparatus in accordance with the invention and showing a part to be cleaned;

FIG. 2 is a transverse section taken on line 2—2 of FIG. 1, one end plate of the vibration generator being removed;

FIG. 3 is an enlarged detail taken from FIG. 1, but with the vibration generator in vertical medial section;

FIG. 4 is a diagrammatic view of the system of FIGS. 1 to 3, and showing also diagrammatic representations of standing waves set up in the system;

FIG. 5 is a diagrammatic view similar to FIG. 4, but illustrating a modification;

FIG. 6 is another diagrammatic view similar to FIG. 4, but illustrating another modification;

FIG. 7 is a side elevational view of another form of the invention, fragmentary portions being broken away to reveal underlying parts in section;

FIG. 8 is a vertical plan section taken in accordance with the line 8—8 of FIG. 7;

FIG. 9 is a transverse section taken on line 9—9 of FIG. 8;

FIG. 10 is a diagrammatic view of the apparatus of FIGS. 7–10, representing the apparatus as though seen in plan, and including a standing wave diagram;

FIG. 11 is a diagrammatic view of the part under treatment in the system represented in FIG. 10, and showing a standing wave diagram representative of vibratory action in the part;

FIG. 12 is a view similar to FIG. 10, but showing a modification;

FIG. 13 is a diagrammatic view representing the part of FIG. 12;

FIG. 14 is a diagrammatic view similar to FIG. 10 but showing a modification;

FIG. 15 is a diagrammatic view representative of the part under treatment in the system of FIG. 14, together with a standing wave diagram;

FIG. 16 is a diagrammatic view illustrative of a modification of the system seen in FIG. 10;

FIG. 17 is a view similar to FIG. 16 but showing another modification; and

FIG. 18 is a view similar to FIG. 16 but showing still another modification.

In FIGS. 1–3 of the drawings, numeral 10 designates generally a part which is to be surface cleaned, any interior sand cores or other dirt thereof broken out and/or scoured away, or left with metal filaments, burrs or "whiskers" which are to be removed. The part 10 may be, for example, a large stamping, a forging or the just-cast cylinder head of an internal combustion engine. Detail of a part and its cores need not be illustrated or described herein, but, in the case of a cylinder head, it will be understood that certain interior sand cores are required during casting to provide interior passages or ports such as for fuel flow to the combustion chamber, exhaust gas discharge, spark plug holes, water jackets, etc. A head casting is usually rectangular, and is here shown as rigidly clamped at one end by a suitable clamp, constituting the output and acoustic coupling means of a vibration generator and elastic vibration transmitting means combination. The clamp 11 in this case holds the casting against one side of elastically vibratory ring 12, constituting the elastic wave or vibration transmitting means. An elastic wave or vibration generator 13 is mounted on ring 12, on the opposite side from the point of engagement between the ring and the casting.

A bracket 14 extending from ring 12 supports an electric drive motor 15 for the vibration generator 13, and includes a hanger portion 16 furnished with an eye 17 by which the entire assembly, including the part 10, is supported through a cable 18 from any suitable overhead support, not shown, but which may be a fixed support, or to obvious advantage, a movable crane, or the like. To accomplish cleaning of the part 10, the same is clamped to the ring 12 by means of the clamp 11, and the assembly then lifted and lowered, by means of suspension cable 18, into a body 19 of loose granular particles, such as sand, in a container 20.

The aforementioned vibratory or vibration transmitting ring 12 is here shown in the general form of a short, hollow cylinder, and is to be composed of an elastic material, of good fatigue properties, such as alloy steel. That is to say, the ring 12 is to be composed of a material capable of withstanding substantial elastic vibratory action, at a fairly large vibratory amplitude, and at a sonic frequency, of the order of hundreds, or even a few thousand cycles per second, without suffering early fatigue failure.

In the present case, the bracket 14 is secured to opposite sides of ring 12 substantially at or near half-way points between the generator 13 and the clamp 11. To this end, the bracket 14 is shown embodying a platform 14a for support of motor 15 and a medially split portion 14b turned at right angles to said platform and having two legs 14c secured to a pair of long machine screws 14d run through opposite sides of the ring 12 at said half-way points. The two legs 14c formed by the split construction described are capable of alternately spreading apart and closing together through a small amplitude through elastic bending of the member 14b and legs 14c to accommodate certain elastic vibratory action of the ring as will be described later.

One side of the ring 12 is engaged against a side surface of the part near one end thereof, as clearly appears in FIGS. 1 and 2. The opposite side of part 10 is engaged by one edge of clamp plate 24, which is mounted on and carried by ring 12 by means of a long bolt 25 and nut 26. On the opposite side of bolt 25 from the part are a pair of toggle links 27 and 28, the former of which pivotally engages at one end in a seat formed in the corresponding edge portion of clamp plate 24, and the latter of which pivotally engages in a seat formed in a support block 29 engaging against ring 12, as shown. The inner or adjacent end portions of the links 27 and 28 engage pivotally in seats formed in a toggle joint member 30 which is adapted to be forced inwardly toward the part to the slightly over-center position illustrated to place the part under adequate clamping pressure. The joint member 30 will be seen in FIG. 1 to be so shouldered as to engage against the links and thus form a stop in the over-center position. The clamp may of course be released by pulling it outward past the center position. It will be evident that the amount of clamping pressure exerted is easily adjustable by means of the large nut 26. Any other suitable clamping means may of course be employed, that here shown being merely illustrative.

The sonic vibration generator 13 is shown diagrammatically. It is of the type first disclosed in my prior patent application entitled, "Vibration Generator for Resonant Loads and Sonic Systems Embodying Same," Ser. No. 181,385, filed Mar. 21, 1962, now Patent No. 3,217,551. For additional details, said application should be consulted.

This vibration generator 13 is of a type producing vibration of a gyratory type as will later appear. In other words, there is produced a force vector which passes through the axis A–A' of the generator (see FIG. 3) and rotates continuously thereon. However, in the illustrative application of the invention, it is only one component of this rotating force vector that is utilized, namely, that which extends diametrically across the elastic ring 12 in the plane of the paper in FIG. 1 i.e., from generator 13 to clamp 11. As will more clearly appear presently, the vibration generator 13 thus delivers a vibratory or oscillating output force component which is along a direction line extending diametrically across the ring 12 in the plane of the paper, from generator to clamp, and which therefore is applied to the end portion of the part 10 as a transversely oriented alternating force, represented by the double-headed arrow F in FIG. 1. The component of force delivered by the generator 13 at right angles to the utilized component F may be ignored, for reasons that will appear presently.

The generator 13 is shown more particularly in FIGS. 2 and 3. It has an exterior housing embodying a cylindrically bored body 35 and end plates 36 and 37. The body 35 is secured to the upper side of ring 12, as for instance by means of screws indicated at 39 in FIG. 1. The bore 38 in body 35 has an axis which coincides normally with the aforementioned generator axis A–A', and this axis A–A' is parallel to the axis of the ring 12.

Bore 38 forms a raceway for a cylindrical orbital inertia rotor of somewhat smaller diameter, generally designated by the numeral 40. The rotor 40 embodies a cylindrical inertia roller 41, of somewhat lesser diameter than that of raceway bore 38, as illustrated in FIGS. 2 and 3, for example, and which is rotatably mounted on an axle 42 projecting axially from the hub portion of a spur gear 43. The pitch circle of this spur gear 43 is of substantially the same diameter as the roller 41. Gear 43 meshes with an internal gear 44 formed or fixed within housing body 35 concentrically with the corresponding raceway bore 38, and whose pitch circle is of substantially the same diameter as said bore.

The rotor 40 is designed to move in an orbital path about its raceway bore 38 as a guide, bearing against the surface of said bore by centrifugal force. In this motion, gear 43 runs in mesh with internal gear 44. To maintain the roller 41 in proper engagement with the raceway 38 while the generator is at rest, or coming up to speed the axle 42 of the rotor is provided with an axial pin 46 which rides around and is guided by a circular boss 47 projecting from end plate 36 on axis A–A'.

Rotor 40 is driven through a universal joint coupling 49 connected between a conically gyratory shaft 50 and the drive shaft of the aforementioned electric drive motor 15, a universal joint 51 being used between shaft 50 and the shaft of motor 15.

The motor 15 may be an adjustable speed motor drive unit, of a well-known type containing adjustable means for varying the speed of the output or drive shaft of the motor. Since the details of such devices are well known, they need not be described herein. It may be mentioned at this point, however, that an adjustable speed drive is desirable.

Rotation of shaft 50 as driven by motor 15 causes spur gear 43 to roll around internal gear 44, the shaft 50 moving in a conical gyratory fashion. The inertia roller 41 rolls on the bearing surface afforded by bore 38, so that the rotor 40 moves in an orbital path. The centrifugal force developed by the rotor moving in this orbital path results in exertion of a rotating force on the body member 35, the force vector rotating about the axis A–A'. Roller 41 turns at nearly the same rate of rotation as the gear 43 with any slight variation or creep therebetween accommodated by the rotatable mounting of the roller on shaft 42. Thus a gyratory force is exerted on the body 35, and this gyratory force is transmitted to and exerted on the elastic ring 12.

The gyratory force vector may be resolved, as intimated earlier, into two alternating force components at right angles to one another. One of these is exerted directly against the side of ring 12, along a diameter thereof, and the other is tangential to the outer periphery of the ring. Generally speaking, or in most cases, the vibration generator is driven by its drive motor 15 at such a frequency as will cause the alternating force components applied normally to the ring 12 to create a condition of standing wave resonance in the vibrating system. In general, or with only rare exceptions, this frequency of operation will not be resonant for the component of vibration exerted tangentially to the ring. Accordingly, the nonresonant vibration produced by the tangential component will be of relatively small amplitude by comparison with the component of vibration normal to the ring, and can be ignored.

Thus, the effective output force of the vibration generator is an alternating force exerted on the side of the ring 12, in a direction normal to the ring, i.e., along a diameter therof, this diameter being that which connects the mounting point of the generator on the ring with the clamping point of the ring to the part 10.

As one typical example of the invention, it may be desired to set up a transverse, one-wavelength standing wave in the part 10, distributed along the length thereof, as diagrammed in FIG. 4, where the transverse standing wave is indicated at $s$. That is expressed by the formula $$\lambda = \frac{c}{f}$$

wherein $\lambda$ is wavelength, $f$ is cyclic frequency and $c$ is velocity of wave propagation. It will be understood that in the diagram FIG. 4, the dimension $w$ of the wave pattern represents the amplitude of transverse elastic vibration in the part at different points therealong. Nodes (regions of minimized vibration) of this pattern occur at $n$, and antinodes (regions of maximized vibration) at $v$. For this case, the ring 12 is designed, by techniques familiar to those skilled in the art, with constants of mass and elasticity such as to have a half-wavelength standing wave distribution of motion thereacross, i.e., from generator to clamp, as represented at $s'$ in FIG. 4. The wave pattern $s'$ will have an antinode $v'$ at the generator, an antinode $v''$ at the clamp, and nodes $n$ at the half-way points where the ring 12 is mounted to the supporting bracket 14. It will be seen that the ring 12 will be alternately elastically flattened an delongated by the alternating force impulses applied to it from generator 13. As the ring receives an inward force impulse, it elastically flattens, the distance across, from generator to clamp, momentarily shortening, while at the same time, the distance across the ring, between the ring mountings to supporting legs 14c, correspondingly increases. This last mentioned distance increase is accommodated by elastic bending apart of legs 14c. During the succeeding outward force impulse from the operator, the ring 12 elastically elongates in its one axis, the distance from generator to clamp increasing, while the distance between ring mountings to legs 14c decreases, accommodated by inward bending of the latter. There is thus vibratory movement at the nodes $n$; but this is not a contradiction of the meaning of the term node, since there is no movement at nodes $n$ in the longitudinal direction of the desired wave motion, i.e., across the ring from generator to clamp.

From FIG. 4, it will be seen that at the clamp, there is an antinode $v''$ of wave pattern $s'$, and also an antinode $v$ of wave pattern $s$. This must be so, since the vibratory amplitude at the output end of the generator and ring combination, i.e., at the clamp, must of necessity equal the vibratory amplitude of the clamped end of the part.

It has been mentioned that the load impedance presented by the clamped part and surrounding sand or other particulate matter is largely resistive or frictional in character. To contend with this load, and deliver a sufficient vibratory force at the clamp to set the part into the desired elastic standing wave vibration, of sufficiently large amplitude to accomplish the purposes of the invention, the vibration generator and ring combination must have a comparatively large output impedance, i.e., it must deliver at the clamp an alternating output force which is largely relative to what the vibratory output velocity at the clamp is when the latter is unloaded. This in turn means a relatively large alternating or vibratory force impulse relative to the vibratory mass of the generator housing and of the ring and clamp. Additionally, the output impedance at the clamp, for good power transference to the clamped part, must be reasonably well matched to the impedance of the part at the clamping point, i.e., to the required ratio of force to velocity in the part at the clamping point for assurance of the desired standing wave pattern in the part.

Finally, it must be understood that one important purpose of the elastic vibration transmission ring is to serve as an elastic stiffness reactor which contributes an amount of elastic stiffness such that the stiffness and mass components of the reactance of the system substantially equal one another at the operation frequency, so as to establish a condition of resonance, or at least near resonance, at which the force-wasting characteristics of the masses that must be vibrated are largely or entirely "tuned out" or avoided. To understand this better, reference should be had to the impedance equation $$Z(\text{impedance}) = \sqrt{r^2 + \left(\omega m - \frac{K}{\omega}\right)^2}$$

where $r$ is frictional resistance, $m$ is the effective vibratory mass inertia of the system, $K$ is elastic stiffness, and $\omega$ is the constant $2\pi f$, where $f$ is the operating frequency. The impedance of the system is minimized and reduced to merely the friction factor $r$ when $$\left(\omega m = \frac{K}{\omega}\right)$$

The stiffness factor for the elastic ring is then made such (for the proposed operating frequency) that when taken with the stiffness factor for the part, and the mass inertia, the resulting reacance $$\left(\omega m = \frac{K}{\omega}\right)$$

for the system as a whole is zero (or minimized). The consequence is that no force is required for vibrating the masses of the system, including the large mass of the part. The only force required is that for overcoming the frictional resistance of the system.

FIG. 5 is a diagrammatic illustration of the behavior of the system when the generator 13 is driven at a harmonic of the fundamental frequency assumed for FIG. 4, in this case, the second harmonic. In other words, the operating frequency of the generator 13 is doubled, giving a full-wave rather than a half-wave standing wave pattern $s'h$ across the ring 12, and a two-wavelength rather than a one-wavelength standing wave pattern $sh$ in the part. The wave pattern $s'h$ across the ring represents the localized mass movements of the ring in the direction across the ring from generator to clamp. It does not pretend to represent the complex lateral components of movement of the ring, which are irrelevant to the invention. In this case, the half-way points around the ring are no longer at nodes of the standing wave pattern, but at antinodes thereof, as clearly indicated. However, elastic flexibility in the ring mounting legs 14c as heretofore described readily accommodates the lateral component of vibration at these points.

FIG. 6 shows a modification of a vibratory system having a smaller diameter and elastically stiffer coupling or vibration transmitting ring 12. In this case, the operating frequency for standing wave resonance is considerably elevated, and only a fractional part of a quarter wavelength of a standing wave appears across the ring, as indicated at $t$, with vibratory amplitude at the clamp correspondingly reduced at the clamp as compared with the location of the generator. There is no intervening node. A transverse wave standing wave pattern $tc$ is set up in the casting and may be at a frequency, for example, to give nearly two wavelengths along the part. The first node $n$ in this case is located less than a quarter wavelength distance from the clamped end of the part and the vibration amplitude at the clamp will be substantial, though less than at a full antinode such as at $v$.

To carry out the process of the invention, utilizing an apparatus such as shown in FIGS. 1-3, a part 10 to be cleaned, such as a casting whose core is to be broken free and removed, has the clamp 11 of the sonic vibration machine attached thereto, for example, in the manner illustrated in FIG. 1, and the machine and part are then lowered into the tank or container 20, usually while sonically driven, so that part 10 is buried within or covered over by a body of particulate matter 19 contained in the latter, all as represented in FIG. 1. As earlier intimated, the specific nature of the particulate matter 19 may vary depending upon the specific purpose to be carried out. For cleaning away surface scale or crust, or remaining particles of core material, the particulate matter 19 may be of an irregular shape nature, such as common sand, or particles of harder materials such as aluminum carbide or silicon carbide. For example, silicon carbide particles such as will pass through a one-eighth-inch mesh screen are suitable. Such hard material has good scrubbing and cleaning properties by which the surfaces are very effectively scoured under the conditions of sonic vibration imparted to the part in relation to the material surrounding and contacting it. Alternately, and particularly when it is desired to clean away or remove metal filaments or whiskers from a casting, left by reason of intrusions of the particles into a sand core, or when it is simply desired to break a core or cores from a casting, the particulate matter may consist of metal pellets. Such metal pellets have increased density and therefore improved inertia, and are of improved effect, by reason of their greater inertia, in breaking away the described metal filaments, as well as in breaking up the sand cores. Obviously, the greater the inertia of the pellets, the greater impacting force of the pellets against the sand core when the core vibrates with the casting against these high-density pellets. I may for this purpose use steel balls up to a quarter inch in diameter, for example, as well as lead shot, of a diameter of say one-eighth inch. These dimensions are given as typical, though without limitation.

The part being buried in the body of particulate matter, drive motor 15 operates to drive generator 13, and the speed of motor 15 is regulated to generate a vibration frequency which produces the desired vibration of the part, preferably at resonance. Several vibration modes have been described in the foregoing, but while these are typical and give good results, others are not excluded. The basic requirement of the invention is simply that the part be subjected to a vigorous sonic, or elastic, vibration, preferably, but not necessarily with a sonic standing wave set up therein, and preferably at resonance, but in any event, so that the part vibrates sonically relative to the particles of matter in which it is buried. For reasons set forth in the introductory portion of the specification, the particles of matter in which the part is embedded have such characteristics as to strongly attenuate sonic waves radiated from the part, so that these waves die out rapidly, and there is no large tendency for the particulate matter to vibrate in step with the part. On the contrary, the particulate matter is relatively inert or dead, so that it tends to remain closed in on or packed relatively closely about the part. What movement is imparted to the particles is thus confined primarily to that which is caused by actual displacement by the vibratory part, with little tendency for the particles to vibrate by sonic wave activity. Relative movement of the sonically vibratory part with respect to the particles is thus maximized, giving large relative cyclic vibratory motion of the part surfaces across the particles, or against the particles. This relative vibratory movement, with particles packed in closely about the part, results in a highly effective cleaning action on the surfaces of the part, as well as an effective core-breaking action on any exposed surfaces of any sand core material. Also, as mentioned earlier the different velocities of sound in the part and in the coating, when sonic waves or vibrations are being transmitted therealong, as when standing waves are set up in the part, for example, cause out-of-phase movements of the part and coating which cause the latter to break free. Also, as explained heretofore, the particles act to clean away the metal elements or whiskers often found on machined, forged, or cast parts, and this performance is particularly effective when the particles are composed of high-density material. Still further, the vibratory treatment is effective to break the sand core free from a casting in the first instance. The sand core, being adhesively joined to the casting, is subjected to alternating sonic frequency half-cycles of compression and tension when a sonic standing wave is set up and established in the casting, and fractures by fatigue failure. Moreover, because of the differing velocities of sound in the casting and in the core, the core (adhesively joined to the casting) does not participate in the relatively large amplitude standing wave pattern undergone by the casting, and consequently shear forces are set up at the interface between the casting and the core which rapidly breaks the core free of the casting. It will be seen that the breaking loose or fracturing of cores does not require the use of the particulate matter, even though the latter may be helpful, as explained earlier. The process of the invention is very effective in breaking, removing and cleaning away sand cores made up with very strong plastic glues. Coatings left by these glues are very hard, and also are scoured away rapidly by the present treatment. It is found that these hard coatings are often very brittle, and yield particularly well to the higher frequency vibrations such as produced under the conditions illustrated in FIG. 5 and also in FIG. 6, described fully above.

Reference is next directed to the modification shown in FIGS. 7–9. As appears in the side elevation of FIG. 7, the sonic machine 60 has a horizontal, floor-engaging base 61, from which rise a pair of horizontally spaced standards 62 supporting a heavy, horizontally disposed, elastic bar or beam 63. In the illustrative case, the bar or beam 63 is generally rectangular in physical form, and composed of a good grade of alloy steel for satisfactory fatigue properties.

In the present illustrative embodiment, the standards 62 mount the bar 63 at two points located approximately 30 percent of the length of the bar inward from the extremities thereof. The bar mountings comprise vertical pins 64 extending vertically through bushings 65 set into suitable vertical bores through the bar, with lower reduced portions 67 of these pins 64 set into supporting blocks 68 affixed to the upper ends of the standards 62. As thus located, the pins 64 engage the bar 63 at nodal regions of the latter when the loaded bar is undergoing a mode of transverse standing wave vibration. The regions of the bar supported by the pins 64 and standards 62 are thus substantially nonvibratory or vibratory at minimized amplitudes. To steady the bar-supporting standards 62, however, or prevent longitudinal sway under any conditions, additional standards 69 are preferably erected from base 61 just outside the two supporting standards 62.

Erected from base 61 is a vertical frame plate 70, supporting an electric drive motor 71 and a bearing housing 72 for a vertical rotatable shaft 73, whose axis is located in a vertical plane disposed at right angles to bar 63 and passing through the center of the bar, the vertical axis X—X' of the shaft 73 passing somewhat to one side of the bar, as clearly appears in the drawings. The drive shaft of motor 71 and the lower end of shaft 73 carry suitable pulleys connected by belts 74.

The upper extremity of shaft 73 is coupled by means of universal joint 76 to a sonically gyratory shaft 77 driving the inertia rotor 78 of a gyratory type of vibration generator generally designated by the numeral 79, and which is of the same type as the generator 13 of the embodiment of FIGS. 1–3. Generator 79 therefore need not be described in minute detail, and it will suffice to say that shaft 77 is coupled by universal joint 80 to a geared inertia rotor 78, which is exactly of the same type as the rotor 40 of FIG. 3, and which moves in an orbital path in the bore 81 of a generator housing body 82, the housing being completed by end plates 83 and 84.

Housing body 82 will be seen to engage a horizontal side face of bar 63, at the mid-point of the bar, and to be accurately located by positioning pins such as 85 (FIG. 9). The outer side of the housing body 82, i.e., the side opposite to that engaged with the bar 63, is engaged by a clamp plate 86, which is connected, immediately above and below bar 63, by means of tie rods 87 to a part-engaging clamp head 88 located beyond the opposite side of bar 63.

In FIGS. 7–9, a part to be cleaned is indicated generally and diagrammatically at 90. As shown in the drawings, this part, which may be of generally rectangular outline, is vertically disposed, and is engaged at its mid-region by the aforementioned clamp plate 88. Also, in the illustrative embodiment, a preferred hydraulic type of clamping means is shown and is indicated generally by the numeral 92. This hydraulic clamping means embodies a cylinder or cup 93, drilled as at 94 to receive and pass the tie rods 87. The cylinder or cup 93 has a bottom wall 95 which is engaged against the adjacent side face of bar 63. The opposite end of cup 93 is closed by a wall 97, the central portion of which has a cup-like part 98 formed with a central bore 99. Spacer sleeves 87a are placed on tie rods 87 between wall 97 and plate 88, and permit the nuts on the tie rods 87 to be set up tightly against plate 88. A piston 100 works within the bore of cup or cylinder 93, and has a central stem portion 101 extending through and packed within bore 99, its extremity carrying, by means of loose pivot 102, a clamp pad 103 adapted for engagement with the side of part 90 opposite from the side engaged by the aforementioned clamp plate 88. Stem 101 has a ball end, as illustrated, engaging in a spherical seat 104 in pad 103, so that the pad 103 is free to accommodate itself to the surface of part 90. Hydraulic fluid under pressure, from a suitable pressure source, is introduced into the inner end of cup 93 via fluid line 105 to apply the clamp, such pressure fluid of course moving piston 100 to the right, as viewed in FIG. 9, so as to clamp the part. Hydraulic fluid on the opposite side of the piston is exhausted at this time via a passage 107 and a hydraulic line 108. The clamp can subsequently be released by introducing hydraulic fluid under pressure into cup 93 via line 108 and exhausting hydraulic fluid in back of the piston via line 105. Suitable pressure source means, control valve and fluid lines for this purpose are well within the skill of the art and need not be illustrated or further described herein.

A box 110 for containing a body of particulate matter 111 is erected in the region to be occupied by the part, and may have suitable access doors, or an open top, through which the part may be introduced and positioned for engagement by the above described clamping means. The details of such arrangement need not be further described, since they may vary widely as needed for particular types of part, and are well within the skill of the art.

From the foregoing description, it will be evident that the vibration generator 79 engages the side of the bar 63 at the mid-point of the bar, and recalling the detailed description of vibration generators of this type, as given earlier in connection with generator 13, it will be clear that the generator 79 exerts an alternating force component F on the bar 63, along a horizontal direction line normal to the bar at its mid-point. The generator 79 is driven by motor 71 at a frequency such that the alternating force component F which it applies to the bar excites an maintains a resonant transverse standing wave $t$ in the bar (see the diagram of FIG. 10), preferably, or usually, a full-wavelength standing wave. FIG. 11 represents the part 90, and alongside thereof is shown a full-wavelength transverse standing wave diagram $u$, indicative of a transverse standing wave set up in the part 90 by reason of the vibratory motion of the clamping point between the bar and the part. Standing wave $t$ is characterized by nodes $n$ (regions of minimized vibration amplitude), large amplitude antinodes $v$ (regions of maximized vibration amplitude) at the ends of the bar, and a center antinode $v'$, whose amplitude is somewhat reduced from those at $v$ because of the loading by the part 90 clamped to the bar at the mid-point. The reduced vibratory amplitude and velocity at $v'$ is correlated with the alternating force component F at that point; and the impedance is higher at $v'$ than at $v$, where the vibratory velocity is greater, and the alternating force correspondingly reduced. It will be noted that, along with the reduction of amplitude at $v'$, the nodes $n$ shift inward somewhat from their normal or idealized positions at points located 25% of the length of the bar from its ends. As here shown, the nodes are approximately 30% of the length of the bar from its ends; and the mountings for the bar are at these 30%-of-length positions, as earlier described.

The impedance at $v'$ is the output impedance of the generator and bar combination, and all impedance and impedance matching relationships are the same as previously described in connection with FIGS. 1–6. The bar 63 is again an elastic vibration transmitting means, even though its elastic vibratory movements do not serve to transmit vibration from generator to part. It functions as a distributed constant vibration transmitting member, with elastic waves or vibrations transmitted within or along itself, so as to contribute elastic stiffness reactance for balancing the mass reactances of the system. Thus, by permitting resonant behavior, the natural force-wasting properties of the large vibrating masses of the system are avoided, as described in connection with the embodiment of FIGS. 1–3.

In the example of FIGS. 7–11, the part 90 is somewhat elongated, clamped in the middle, and a standing wave $u$ is set up therein. It may of course be otherwise clamped, as at its end, and a somewhat similar standing wave attained. The standing wave $u$ is a transverse standing wave, and is substantially the same as the wave $s$ set up in the part as represented in FIG. 4. The wave or elastically vibratory action so set up in the part, surrounded by particulate matter such as described in connection with FIGS. 1–3, produces cleaning and core breaking and removal actions such as already described in connection with FIGS. 1–3, and need not be here described again. The apparatus of FIGS. 7–9 has the advantage over that of FIGS. 1–3 that it is better physically adapted for handling large and massive parts.

In FIGS. 12 and 13 are represented a case wherein the apparatus of FIGS. 7–9 is used to vibrate a part 90a of short dimensions, such that a full standing wave pattern may not be developed therein. However, the part 90a will be bodily vibrated at sonic frequency, and good cleaning action attained, even though some of the above mentioned advantages of standing wave action in the part may not be available. The standing wave $t$ in the bar 63 is like that of FIG. 10.

FIGS. 14 and 15 represent a case exactly like that of FIGS. 10 and 11, excepting that the frequency of generator 79 is doubled, so as to work at the second harmonic. The wave pattern $t'$ and $u'$ thus have two wavelengths rather than one wavelength as in FIGS. 10 and 11, and the frequency is doubled, with benefits described in connection with FIG. 5.

FIG. 16 is a diagrammatic representation of a modification wherein the vibration generator is interposed between the center portion of a vibratory bar 63a, like the bar 63 described earlier, and similarly mounted, and a part 90b. In this case, the part, which is again elongated, is arranged in general parallelism with the bar 63. The generator 79 will be understood to be mounted by any suitable fixture, not shown, on the center portion of the bar; and a clamp, represented diagrammatically at 92b, secures the generator to the mid-region of the part. Here, the generator directly exerts an alternating force component F in a lateral direction on the mid-point of the part. It exerts a similar alternating force component F' on the bar 63, causing elastic waves or vibrations to travel along bar 63. The generator 79 is run at a frequency to generate standing wave patterns $b$ and $c$ in the bar and part respectively, as indicated. Here again, the elastic bar, though functioning to transmit elastic vibrations, in order to have the necessary characteristic of a distributed constant vibratory member and to provide the system with elastic stiffness reactance so as to attain or approach resonance, does not function as a transmitter of vibrations from the generator to the part.

Reference is next directed to a further modification, diagrammatically represented in FIG. 17, and wherein the elastic bar does have an important added property in acting as a transmitter of vibrations from the vibration generator to the part, and in serving as a useful acoustic lever in so doing. Here, the vibration generator 79 is mounted to the mid-point of the elastic bar 63, as before. However, the part 90c to be vibrated is mounted, through any suitable clamp, diagrammatically represented at 92c, at an extremity of the bar, where the vibratory bar normally has an antinode. Generator 79 is driven at a frequency to set up a transverse standing wave pattern $t''$ in the bar 63. Part 90c may be assumed to be vertically elongated, clamped at its mid-point to the bar, and fairly massive. It may then have a lateral standing wave pattern set up in it, much as suggested in FIG. 11. The subsantial mass loading presented by the part may then reduce the vibratory amplitude of the standing wave at the clamping point between bar and part, as represented at $vc$. Full antinodes occur at the mid-point of the bar, as at $v$, and at the unloaded end, as at $v'$. It will be seen that at the generator 79, and the antinode $v$ in the bar, there is a certain vibratory velocity and alternating force magnitude F, and that from this point to the clamping point to the part, there is a reduction in vibratory velocity amplitude, which must be accompanied by a correlative increase in alternating force amplitude over the magnitude F existing at the generator. This "acoustic lever" effect is of advantage in transforming a condition of acoustic impedance at the coupling point between generator and bar which is low enough to permit easy drive by the vibration generator to a condition of substantially higher impedance at the coupling point to the part, such as permits the setting up of an effective, good amplitude standing wave in the part. This, of course, can occasionally be something of a problem when the part is large or intricate, and is buried in sand, lead shot, or the like. The acoustic lever effect is of great aid in combatting this problem.

FIG. 18 shows, diagrammatically another modification, again incorporating an acoustic lever. The bar 63 and part 90 are arranged as in FIGS. 10 and 11; but the vibration generator 79 is attached to one extremity of the bar, where it applies to the latter the lateral force component F. A standing wave pattern $t$ like that of FIG. 10 is achieved in this case, with reduction in velocity amplitude and gain in force from the region of generator 79 to the region of part 90, as indicated by the reduced amplitude of the standing wave pattern at the part. In terms of impedance, there is a desirable gain in impedance in the bar from the region of the generator to the region of the part, permitting the generator, operating at a given impedance, to effectively drive a considerably higher impedance load composed of a sand buried part.

It will be understood that the impedance considerations referred to in the introductory portion of this specification and again in connection with FIGS. 1–3, apply generally to all forms of the invention, and are very important to good performance of the sonic machines of the invention.

It will also be understood that while I have disclosed various forms and modifications of the invention, they are for illustrative purposes only, and numerous additional modifications will be suggested which are within the generic scope of the invention as defined by the broader of the appended claims.

I claim:
1. Apparatus for cleaning parts, comprising:
   a body of loose granular material in which the part to be cleaned can be immersed,
   an orbiting mass oscillator,
   an elastic resonant vibration transmission means acoustically coupled to said oscillator, and
   a vibratory output clamp acoustically coupled to said oscillator and vibration transmission means, said clamp being capable of engagement with said part for immersing said part in said body of loose granular material, whereby said part can be cleaned by resonantly vibrating in said loose particles.
2. The subject matter of claim 1, wherein said oscillator and transmission means have an output impedance in the region of said clamp of the order of magnitude of the impedance presented by said part at the point of clamping of the part by the clamp.
3. The subject matter of claim 1, wherein said transmission means is acoustically intercoupled between said oscillator and said clamp.
4. The subject matter of claim 1, wherein said vibration transmission means is intercoupled with said oscillator and is geometrically configured to be vibrated by cyclic forces received from said oscillator in a standing wave pattern at the frequency of operation of said oscillator.
5. The subject matter of claim 1, including means driving said oscillator at an operating frequency which is capable of establishing a standing wave in said part, and wherein said vibration transmission means has physical constants providing a stiffness reactance which is subtractive from the mass reactance of the part so as to approach resonant vibration.
6. Apparatus for cleaning parts, comprising:
   a body of loose granular material in which the part to be cleaned is immersed,
   an orbiting mass oscillator,
   an elastically resonant vibrating reactor, and
   a vibratory clamp for engaging said part when immersed in said loose granular material,
   said oscillator, said reactor, said clamp, and said part being acoustically intercoupled with one another, whereby said reactor, said clamp and said part are vibrated by said oscillator, and
   said reactor having an elastic stiffness reactance acting to counteract mass reactance of the oscillator, clamp and part at the operating frequency of the oscillator.
7. The subject matter of claim 6, wherein said reactor is intercoupled between said oscillator and said clamp and functions to transmit elastic vibrations therebetween.
8. The subject matter of claim 6, wherein said oscillator is coupled directly to both said reactor and said clamp.
9. The subject matter of claim 6, wherein said operating frequency of said oscillator is so related to the physical dimensions of said part and the factors of mass and elasticity thereof to set up an elastic standing wave in said part.
10. The subject matter of claim 3, wherein said vibration transmission means comprises an elastic ring coupled at one side to said oscilaltor and at the other to said clamp, and
    yielding means for supporting said ring at points between said oscillator and clamp.

References Cited

UNITED STATES PATENTS

| | | | |
|---|---|---|---|
| 2,735,231 | 2/1956 | Simjian | 51—7 |
| 2,796,702 | 6/1957 | Bodine | 51—7 |
| 2,960,314 | 11/1960 | Bodine | 51—59 X |
| 2,985,954 | 5/1961 | Jones | 29—470 |
| 3,027,690 | 4/1962 | Roney | 51—59 |
| 3,239,965 | 3/1966 | Roney | 51—92 |
| 2,883,809 | 4/1959 | Simjian | 51—7 XR |
| 3,128,577 | 4/1964 | Guibert | 51—7 |

LESTER M. SWINGLE, *Primary Examiner.*

J. A. MATHEWS, *Assistant Examiner.*